Nov. 13, 1951 A. R. DOUCETTE 2,574,777
PORTABLE EQUIPMENT FOR INDUCTIVE CARRIER COMMUNICATION SYSTEMS
Original Filed June 23, 1947
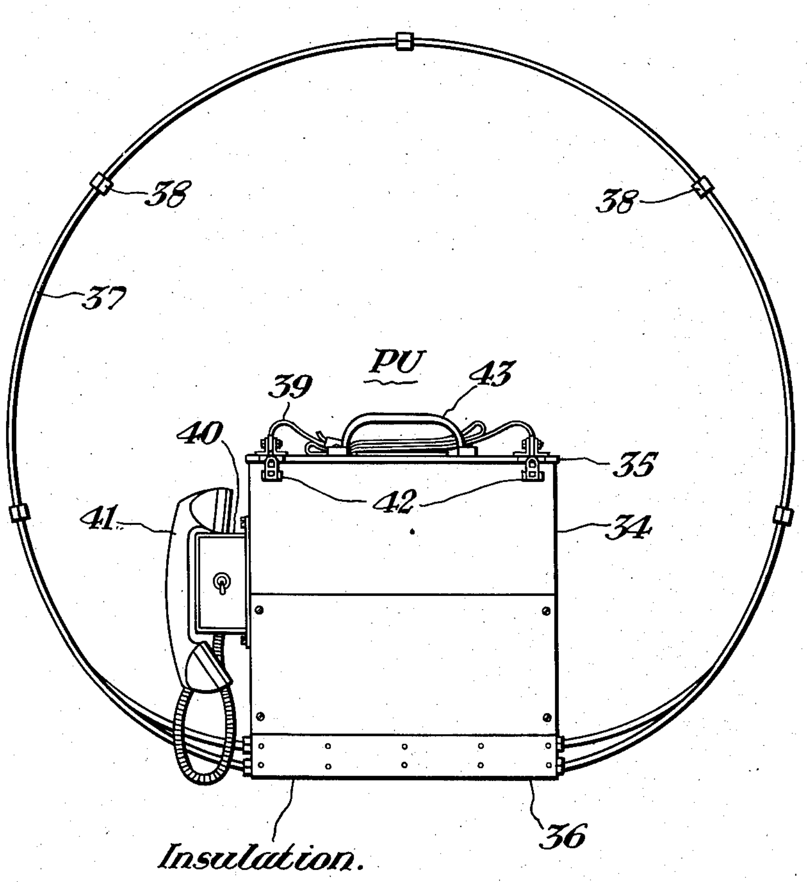
INVENTOR.
Adrian R. Doucette.
BY
[signature]
HIS ATTORNEY Patented Nov. 13, 1951

2,574,777

UNITED STATES PATENT OFFICE 2,574,777

PORTABLE EQUIPMENT FOR INDUCTIVE CARRIER COMMUNICATION SYSTEMS

Adrian R. Doucette, Swissvale, Pa., assignor to Westinghouse Air Brake Company, a corporation of Pennsylvania Original application June 23, 1947, Serial No. 756,363. Divided and this application December 24, 1949, Serial No. 135,005

3 Claims. (Cl. 179—82)

My invention relates to portable equipment for inductive carrier communication systems, and more particularly to portable equipment for inductive carrier railway train telephone systems.

The present application is a division of my copending application, Serial No. 756,363, filed June 23, 1947, for an Assembly for Communication Apparatus, now Patent No. 2,515,638, granted July 18, 1950.

In communication systems for mobile units, such as, for example, railway trains, communication is ordinarily provided between the front and rear ends of a train, between two different trains, and between a train and a wayside station. It is also desirable in such communication systems for railway trains to provide a portable equipment which a trainman may carry with him when inspecting the train and when doing flagging and switching duties. Such a portable equipment will enable the trainman to keep in better touch with other members of the train crew at the front and rear ends of the train and also keep in touch with an operator at a nearby wayside station. Also, there are many other places in connection with railway train operation where portable telephone equipments are useful, for example, portable equipment would be useful at location of an accident and on work trains in order to enable the wreck-master and supervisors to keep in touch with the train crews of other trains and with the operators at wayside stations.

In inductive carrier train communication systems, the existing line wires and other conductors paralleling the track are used as the transmitting medium or circuit for conveying the current along the railway, these conductors serving as the transmitting medium due to the longitudinal circuit formed by the line wires and other conductors, the distributed impedance of the line wires and conductors to ground and to each other and the ground return path.

In view of the foregoing conditions in communication systems for mobile units, a feature of my invention is the provision of a novel and improved portable equipment or unit for an inductive carrier communication system.

A more specific feature of my invention is the provision of a novel and improved portable equipment for an inductive carrier railway train telephone system.

Other features, objects and advantages of my invention will appear as the specification progresses.

I shall describe one form of portable equipment embodying my invention and shall then point out the novel features thereof in claims.

The accompanying drawing is a diagrammatic view showing one form of portable equipment embodying my invention when used with an inductive carrier telephone system for railways.

It will be understood that my invention is not limited to inductive carrier telephone systems for railway trains, and this one form of the equipment serves as an illustration of the usefulness of the invention, there being other places where the invention can be used.

Referring to the drawing, the portable equipment comprises an assembly of apparatus designated as a whole by the reference character PU, a hand set 41 and an inductor 37. The assembly of apparatus PU may take different forms and preferably it comprises a transmitter and a receiver and a power source similar to those disclosed in my aforementioned copending application, Serial No. 756,363, the specific form of the transmitter and receiver forming no part of the present invention. It is sufficient for the present application to point out that the transmitter and the receiver of the apparatus PU here contemplated use a frequency modulated carrier telephone current, the transmitter being preferably of the reactance-modulator type and the receiver being of a heterodyne form. Also, two-way communication is effected on a given carrier frequency by simplex operation.

This assembly of apparatus PU is housed in a case 34 of suitable material, the case 34 being of dimensions required to house the associated apparatus. The arrangement is preferably such that the apparatus assembly can be placed in the case 34 when the top cover 35 of the case is removed or opened, the case 34 being provided with suitable fastenings 42 which secure the cover 35 to the case. In addition to housing the transmitter and receiver, the case 34 is made suitable to house a source of power for energizing the apparatus. The source of power may be dry batteries or a low voltage storage battery together with a vibrator and a transformer. In either case the power source is made suitable to provide the different voltages required for the electron tubes of the apparatus.

The case 34 is secured to a tray 36 which is preferably made of insulation material, the tray 36 serving as a base for the case 34. The tray 36 also serves as a means for anchoring the inductor 37, as will be described shortly. The cover 35 is provided with a handle 43 and with a carrying strap 39, the handle 43 and strap 39 enabling an operator to carry the equipment about, as will be pointed out hereinafter. At one end of the case 34 there is fitted a control box 40 which is formed with means for carrying a hand set 41 and which hand set is cable connected to the apparatus within the case. Thus, during noncommunication periods the hand set 41 is carried on the case out of the way of the operator carrying the equipment but the hand set is in a position for the operator to reach and use when he desires to telephone. The hand set 41 would include the usual push-to-talk switch for selective control of the transmitter and receiver of the apparatus assembly in order that two-way communication on the same carrier frequency can be effected.

The inductor 37 is preferably an air core coil or loop of one or more turns of a relatively stiff conductor of a light material, such as aluminum. The turns of the inductor 37 pass through the tray 36 and the ends of the coil are terminaled on the underside of the tray for connection with the apparatus within the case 34. In other words, the conductor used to form the coil 37 is of a diameter large enough so that the coil is stiff and self-supporting. In practicing the invention I have found that an aluminum conductor of the diameter of the order of ¼ inch is satisfactory. For reasons to appear shortly, the coil is preferably made of a diameter of the order of 30 inches but coils of other diameters can be used. Preferably several spacers 38 of suitable insulation material are spaced about the coil 37 to hold the turns of the coil apart when more than one turn is used in the coil. Thus, the coil 37 forms a loop which is adaptable for sending and receiving a carrier telephone current by induction. That is, the coil 37 as here constructed can be positioned for the plane of the coil to be parallel to a line wire of a line circuit for inductive relation to the line circuit. Also, the coil is of a size that a sufficient transfer of energy between a line circuit and the coil by induction is effected.

As stated hereinbefore, the ends of the coil 37 are terminaled on the underside of the tray 36 at terminals, not shown, and through which terminals the coil can be coupled either to the transmitter or to the receiver of the apparatus housed within the case 34. The arrangement would preferably be such that the coil 37 is effectively coupled to the transmitter during transmitting or sending periods and then switched and effectively coupled to the receiver during receiving periods, such switching being carried out by means controlled by the push-to-talk switch of the hand set 41.

It is to be pointed out that with the loop 37 passing through the tray 36 and the case 34 secured to the tray in the manner shown in the drawing, the case is inside of the coil. That is to say, the apparatus of the portable equipment as here shown is disposed to be inside of the inductor. In practicing the invention I have found that the placing of the apparatus inside the inductor results in a construction that materially aids in the carrying of the equipment.

An operator wishing to use the portable equipment would put the carrying strap 39 over his shoulder for the unit to be suspended at his side, the inductor 37 being of a diameter sufficient so that it will pass over the operator's shoulder to be free from contact with his clothing, it being desirable for coil 37 to be free from contact with the operator's clothing because such contact may cause a high resistance ground connection. In this position of the unit, the unit can be carried with little interference to the operator as he is making an inspection of the train or is engaged with flagging or switching duties.

Furthermore, the diameter of the coil 37 is sufficient to insure effective inductive relationship between the coil and the line wires paralleling the track when some distance from the line wires, the line wires serving as a longitudinal circuit for transmission of a carrier telephone current along the right of way. Also, with the unit suspended at the operator's side, the operator can easily stand for the plane of the coil 37 to be substantially parallel with the line wires along the track and provide the most effective inductive relationship with the line circuit. It is further apparent that with portable equipment here disclosed the tray 36 is of sufficient length and thickness so that the equipment can be set down on the ground with the tray 36 as a base and the inductor 37 and apparatus case 34 in an upright position and the equipment used with the apparatus set up as an emergency equipment.

The portable equipment here disclosed has the advantages that the apparatus is housed in a case which is mounted inside of a self-supporting coil or inductor of a size effective for the sending and the receiving of a carrier telephone current by induction. The unit when carried by an operator is suspended at his side to be carried with a minimum of inconvenience to him while he is performing his usual tasks and the equipment in this position is readily accessible for telephone purposes when he wishes to carry on communication. Also, the equipment is self-supporting and it can be used when set down on the ground.

Although I have herein shown and described but one form of portable equipment for inductive carrier communication systems embodying my invention, it is understood that various changes and modifications may be made therein within the scope of the appended claims without departing from the spirit and scope of my invention.

Having thus described my invention, what I claim is:

1. In a portable unit for inductive carrier telephone apparatus, the combination comprising, an air core coil of at least one turn of a relatively stiff metallic conductor, said conductor forming a self-supporting loop which is adaptable for sending and receiving a carrier telephone current by induction, a tray of insulating material through the ends of which tray said coil passes and in which tray the ends of the coil are terminaled, a case for housing inductive carrier telephone apparatus, said case secured to said tray in a position for the case to be within the coil, said case provided with a carrying strap which will enable an operator to carry the coil and case at his side suspended from his shoulder, said coil of a diameter that the top of the loop passes above the shoulder of the operator to be free from contact with the operator, a hand set, said case formed with means for carrying the hand set during noncommunication periods, and said hand set cable connected to said telephone apparatus to enable the operator to telephone when he is carrying the unit.

2. In a portable equipment for an inductive carrier communication system which uses a line circuit for transmission of the current between spaced points, the combination comprising, an inductor consisting of an air core coil the turns of which coil are made of a relatively stiff metallic conductor, the conductor being of a diameter sufficient for the coil to be self-supporting, a tray of insulating material, said turns of said coil passing through said tray and the ends of the coil being terminaled in the tray, a case, said case being constructed for housing carrier communication apparatus and being secured to said tray in a position for the case to be within said coil, said tray being of some length and thickness to form a base by which the coil and case can be set down with the coil and case in an upright position, and carrying means secured to said case to enable the coil to be placed in a position for inductive relation with a line circuit.

3. In a portable equipment for an inductive carrier telephone system which uses a line circuit for transmission of the current between spaced points along a trackway of mobile units, the combination comprising, an inductor consisting of an air core coil made up of a relatively stiff conductor, said conductor being of a size sufficient for the coil to be self-supporting, a member of insulating material, said coil having its turns passing through said member, and its two ends terminaled in the member, said member having sufficient length and thickness to enable the coil to be set down in an upright position with the member as a base, a case, said case being constructed to house carrier telephone apparatus, said case secured to said member in a position for the case to be within the coil and for the telephone apparatus to be connected to the terminals of said coil, carrying means secured to said case to enable the coil and case to be carried about and positioned for said coil to be in a plane substantially parallel to a line circuit, and said coil being constructed of a diameter preselected to provide a given inductance with respect to the line circuit when positioned in a plane parallel to and a given distance from the line circuit.

ADRIAN R. DOUCETTE.

REFERENCES CITED

The following references are of record in the file of this patent:

UNITED STATES PATENTS

| Number | Name | Date |
|---|---|---|
| D. 135,540 | Mitchell | Apr. 20, 1943 |
| 1,794,026 | Magee | Feb. 24, 1931 |
| 1,930,270 | Hayward | Oct. 10, 1933 |
| 1,993,436 | Eberhard | Mar. 5, 1935 |
| 2,064,642 | Bossart | Dec. 15, 1936 |
| 2,252,751 | Benisek | Aug. 19, 1941 |
| 2,299,058 | Mitchell | Oct. 13, 1942 |
| 2,307,805 | Schell | Jan. 12, 1943 |
| 2,419,833 | Grimes | Apr. 29, 1947 |